(12) United States Patent
Burns

(10) Patent No.: US 6,201,336 B1
(45) Date of Patent: Mar. 13, 2001

(54) DC BIAS SCHEME FOR FIELD INDUCED PIEZOELECTRIC POWER GENERATORS

(75) Inventor: Joseph R. Burns, Trenton, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 09/327,095

(22) Filed: Jun. 5, 1999

Related U.S. Application Data

(60) Provisional application No. 60/089,082, filed on Jun. 12, 1998.

(51) Int. Cl.$^7$ .................................................. H01L 41/113

(52) U.S. Cl. ............................................. 310/319; 290/53

(58) Field of Search ...................... 310/319, 339; 60/497; 290/53

(56) References Cited

U.S. PATENT DOCUMENTS

| | | | | |
|---|---|---|---|---|
| 3,801,839 | * | 4/1974 | Yo ........................................ | 310/319 |
| 4,139,826 | * | 2/1979 | Pradal ............................... | 331/116 R |
| 4,680,498 | * | 7/1987 | Takasugi et al. .................... | 310/339 |
| 4,816,713 | * | 3/1989 | Change ................................ | 310/319 |
| 5,347,870 | * | 9/1994 | Dosch et al. ......................... | 310/319 |

* cited by examiner

Primary Examiner—Thomas M. Dougherty
(74) Attorney, Agent, or Firm—Michael Y. Epstein, Esq.

(57) ABSTRACT

A d.c. bias arrangement for increasing the efficiency of electrical power extraction from a piezoelectric transducer comprising a piezoelectric material, particularly of the electrostrictive type, contacted by first and second electrodes. The first electrode is connected directly to an electrical load connected directly to ground potential. The second electrode is connected by two in-parallel paths to the ground potential, one of the paths comprising a d.c. voltage source in series with a large bias resistor, and the other of the paths comprising a large a.c. power bypassing capacitor.

4 Claims, 2 Drawing Sheets

DC BIAS SCHEME FOR FIELD INDUCED PIEZOELECTRIC POWER GENERATORS

This application claims the benefit of U.S. Provisional Application 60/089,082, filed Jun. 12, 1998.

BACKGROUND OF THE INVENTION

This invention relates, in general, to power generation from piezoelectric materials, and particularly to an improved DC bias scheme for improved efficiency use of various electrostrictive materials for piezoelectric power generation.

A recent development in the field of piezoelectric power generation from natural sources of energy and the like is the use of "field-induced piezoelectricity" in electrostrictive materials. Typically, electrostrictive materials have very weak piezoelectric characteristics (related to a materials parameter known as $d_{31}$). However, if a DC bias is applied across the materials, e.g., by means of a pair of electrodes on opposite surfaces of an electrostrictive material such as polyurethane, the piezoelectric characteristics can be significantly increased and in proportion to the DC bias.

Circuit arrangements for applying a DC bias between electrodes are well known. In general, a DC bias voltage is applied through a large bias resistance serving to prevent significant DC current flow within the biasing circuit. A problem, however, is that the bias resistor in known arrangements is in parallel with the load of the generator system and, particularly in those instances where the load resistance is quite high, a significant portion of the AC power generated by the system is lost in the bias circuit.

SUMMARY OF THE INVENTION

A DC bias is applied to the ground side of an electroded piezoelectric device and is thus separated from the load by the inherent capacitance of the piezoelectric device. Additionally, a capacitor normally present in the prior art arrangement for isolating the DC bias from the load is used in the inventive arrangement for bypassing the AC power current around the bias resistor.

DESCRIPTION OF PREFERRED EMBODIMENTS OF THE INVENTION

Figure 1:
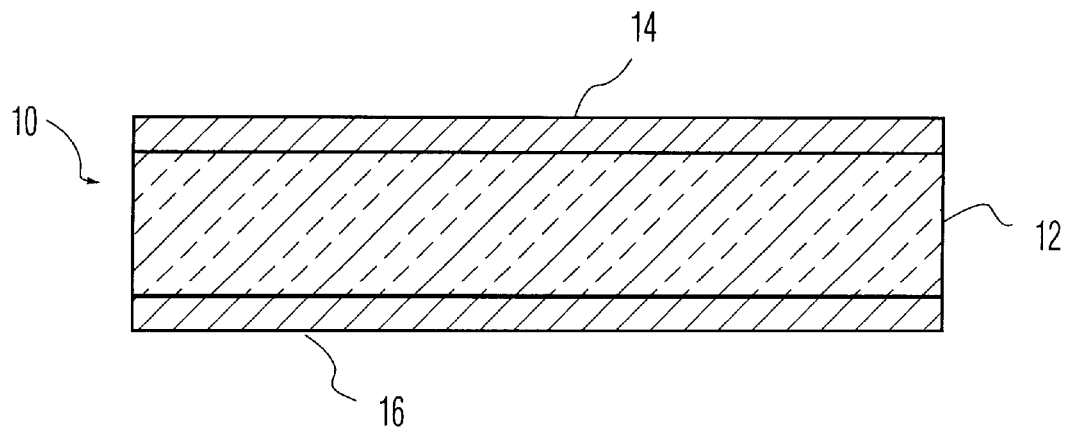
FIG. 1 is a schematic, side sectional view of a known type of piezoelectric transducer.

FIG. 1 shows, schematically, a piezoelectric transducer 10 of known type comprising a layer 12 of a piezoelectric material and a pair of electrodes 14 and 16 contacting opposite surfaces of the layer 12. Terminals, not shown, are connected to the electrodes. In accordance with known technology, upon mechanical energy being applied for cyclically straining and destraining the layer 12, an a.c. voltage is generated between the two electrodes which can be used for transferring electrical energy generated by the transducer to an electrical load. The amount of power transferred is a function of, among things, the efficiency of conversion of mechanical to electrical energy by the layer 12.

A recent development in the piezoelectric power transducer field is the use of known "electrostrictive" materials, particularly polyurethane. Traditionally, such electrostrictive materials have been used not to generate electrical power, but in reverse, where a.c. signals are used to produce precisely controlled mechanical movements. While the use of d.c. biasing arrangements is known in such applications, power consumption efficiency is of relatively small concern and when such known d.c. biasing arrangements are used in electrical energy generating transducers, it is found that the power loses associated with the bias supply are excessively high. This is explained as follows.

Figure 2:
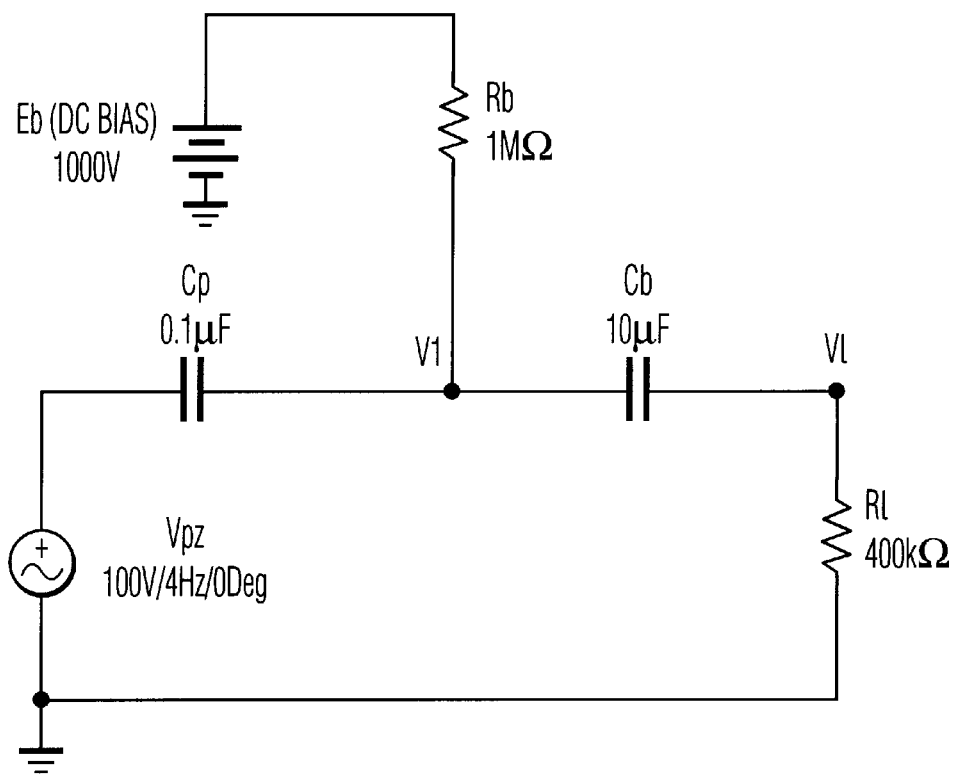
FIG. 2 is a schematic circuit diagram of a known DC bias circuit for use with a field-induced piezoelectric generator.

A conventional method of applying a DC bias field is shown in FIG. 2 where the voltage generator $V_{PZ}$ and the capacitor $C_P$, combination are the equivalent circuit of a field-induced piezoelectric power generator, such as shown in FIG. 1, which is being mechanically cyclically strained and destrained. By applying a DC voltage across the electrodes, far greater power conversion efficiency results. $E_B$ (in FIG. 2) is the desired DC bias, $R_B$ the bias resistor, $C_B$ a blocking capacitor (which isolates the DC bias from the load), and $R_L$ the load resistance.

It is seen that the bias resistor $R_B$ is in parallel with the load ($R_L$) and "steals" power from the load. This is obviously undesirable and can be a significant degradation of the recoverable power from the system. To illustrate, there is an optimum value for $R_L$ to achieve maximum load power which is given by the relationship in Equation (1) below.

$$(R_L)_{OPT}{}^2 = (1/\omega^2 C_P{}^2 + 1/R_B{}^2) \qquad (1)$$

At this optimum and for the other component values of FIG. 2, the effect is a 32% loss in conversion efficiency, which is far too high. The degradation can be reduced by using higher values of $R_B$ but this is limited because of other circuit leakages and the tan δ loss of the polyurethane itself $$(\tan)\delta = \frac{1}{Q} = \frac{1}{R_D W C_P},$$

$R_D$ = parallel loss resistance).

Figure 3:
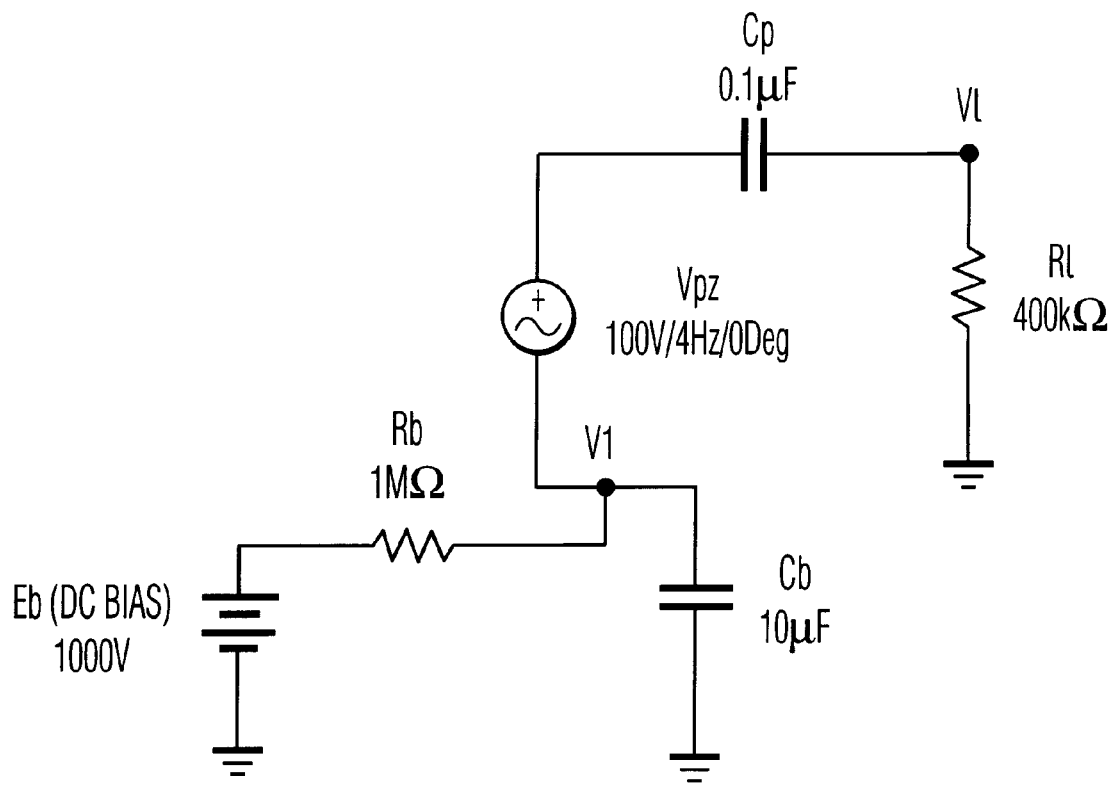
FIG. 3 is a view similar to FIG. 2 but showing the arrangement of a bias circuit in accordance with the invention.

A preferred and alternative implementation of the required DC bias in accordance with this invention is shown in FIG. 3.

In this scheme, the DC bias is applied to the ground side of an electroded power generator and separated from the load by the piezoelectric capacitance $C_P$. The function of $C_B$ is not series blocking but to bypass the AC power current from $R_B$. Maximum power transfer occurs when $R_L = 1/\omega C_P$, and under these conditions.

$$V_1 \approx -C_P/C_B V_{PZ} \qquad (2)$$

$$V_L \approx (V_{PZ} + V_1) R_L / (R_L{}^2 + 1/\omega^2 C_P{}^2))^{0.5} \qquad (3)$$

$$P_{OUT} \approx V_{PZ}{}^2 (1 - C_P/C_B)^2 \omega C_P / 2 \qquad (4)$$

$$P_{MAX} \approx V_{PZ}{}^2 \omega C_P / 2 \qquad (5)$$

From Equations (2), (3), (4), and (5) the power transfer loss $(1 - P_{OUT}/P_{MAX})$ is less than 1% under identical conditions and component values as used in the FIG. 2 circuit configuration. Exact computer simulations show the loss to be closer to 0.5%.

What is claimed is:

1. A method of operating a piezoelectric power transducer having first and second electrodes, the method comprising exposing the transducer to a source of mechanical energy for causing the transducer to generate an a.c. voltage between said electrodes, and transferring a.c. power from the transducer to an electrical load by contacting two terminals of the load to said first electrode and to ground potential, respectively, and applying a d.c. bias voltage between said electrodes by connecting said second electrode to ground potential through two in-parallel paths, one of said paths including a d.c. bias voltage source in series with a current limiting resistor, and the other of said paths including a capacitor for bypassing a.c. current through the load around the current limiting resistor.

2. A method according to claim 1 wherein said piezoelectric material is an electrostrictive material and the transducer electrodes are charged to around 100 volts a.c., the load resistance is around 400K ohms, the bias voltage is around 100 volts, the current limiting resistor is around 1 mg ohm, and the bypassing capacitor is around 10 $\mu$F.

3. A d.c. biasing arrangement for a power generating piezoelectric transducer having a pair of electrodes contacting a piezoelectric material, a first of said electrodes, during use of said transducer, being connected to a ground potential through an electrical load used for collecting power generated by the transducer, the biasing arrangement comprising a parallel circuit including two paths for being connected between a second of said electrodes and said ground potential, one of said paths including a d.c. bias voltage source in series with a current limiting resistor, and the other of said paths including a capacitor for bypassing a.c. current through the load around the current limiting resistor.

4. An arrangement according to claim 3 for biasing said transducer when used with an electrical load of around 400K ohms, and wherein said electrodes contact an electrostrictive piezoelectric material for being charged, during use of said transducer, to around 1000 volts a.c., and wherein the bias voltage is around 100 volts, the current limiting resistor is around 1 mg ohm, and the bypassing capacitor is around 10 $\mu$F.

* * * * *

UNITED STATES PATENT AND TRADEMARK OFFICE
CERTIFICATE OF CORRECTION

| | | |
|---|---|---|
| PATENT NO. | : 6,201,336 B1 | Page 1 of 1 |
| APPLICATION NO. | : 09/327095 | |
| DATED | : March 13, 2001 | |
| INVENTOR(S) | : Joseph R. Burns | |

It is certified that error appears in the above-identified patent and that said Letters Patent is hereby corrected as shown below:

The specification is to be amended to include the following statement which is to be inserted in Column 1, after the title and before "This application claims the benefit of U.S. Provisional . . .":

--This invention was made with Government support under Contract/ Grant N00014-98-C-0274 awarded by the Department of the Navy. The government has certain rights in the invention.--

Signed and Sealed this

Thirtieth Day of January, 2007

JON W. DUDAS
*Director of the United States Patent and Trademark Office*